(12) United States Patent
Chan

(10) Patent No.: US 10,644,521 B2
(45) Date of Patent: May 5, 2020

(54) RECHARGER WITH OVER-TEMPERATURE PROTECTION AND CAPABLE OF RECORDING OVER-TEMPERATURE INFORMATION

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 141 days.

(21) Appl. No.: 16/029,663

(22) Filed: Jul. 9, 2018

(65) Prior Publication Data
US 2019/0288530 A1 Sep. 19, 2019

(30) Foreign Application Priority Data
Mar. 16, 2018 (TW) .............................. 107108933 A

(51) Int. Cl.
*H02J 7/00* (2006.01)
*H02J 7/14* (2006.01)

(52) U.S. Cl.
CPC .......... *H02J 7/0029* (2013.01); *H02J 7/0091* (2013.01)

(58) Field of Classification Search
USPC ...................................................... 320/150
See application file for complete search history.

(56) References Cited

U.S. PATENT DOCUMENTS

| | | | |
|---|---|---|---|
| 8,045,344 B2* | 10/2011 | Grant | H02M 3/33523 320/166 |
| 2001/0000212 A1* | 4/2001 | Reipur | H01M 10/4257 320/104 |
| 2012/0068545 A1* | 3/2012 | Shim | H01M 10/425 307/80 |
| 2013/0257379 A1* | 10/2013 | Kato | H02J 7/0029 320/128 |
| 2016/0156204 A1* | 6/2016 | Kim | H02J 7/0021 320/134 |
| 2017/0149273 A1* | 5/2017 | Lee | H05B 33/0815 |
| 2018/0013300 A1* | 1/2018 | Yao | H02H 7/1227 |

* cited by examiner

Primary Examiner — Alexis B Pacheco
(74) Attorney, Agent, or Firm — Winston Hsu

(57) ABSTRACT

A recharger includes a power supply circuit, an output circuit, a detection circuit, a micro-controller, and a restart circuit. The detection circuit includes a resistor and an NTC thermistor. The resistor includes a first end coupled to an auxiliary voltage provided by the power supply circuit. The NTC thermistor includes a first end coupled to a second end of the resistor and a second end coupled to a bias voltage. The micro-controller, including a pin coupled between the resistor and the NTC thermistor, turns off when the pin level is lower than a reference voltage. The restart circuit includes a comparator having a positive input end coupled to the pin, a negative input end coupled to a restart voltage, and an output arranged to output an enable signal when the level of the pin is higher than the restart voltage, thereby activating the output circuit for providing an output voltage.

10 Claims, 2 Drawing Sheets

| internal device | temperature at over-temperature occurrence | corresponding NTC | NTC resistance at room temperature | NTC resistance at over-temperature occurrence | sensing voltage at over-temperature occurrence |
|---|---|---|---|---|---|
| main transformer | 100°C | NTC1 | 2KΩ | 500Ω | VT1=1.8V |
| output diode | 110°C | NTC2 | 2KΩ | 300Ω | VT2=1.13V |
| main switch | 130°C | NTC3 | 2KΩ | 100Ω | VT3=0.39V |

FIG. 2

RECHARGER WITH OVER-TEMPERATURE PROTECTION AND CAPABLE OF RECORDING OVER-TEMPERATURE INFORMATION

CROSS REFERENCE TO RELATED APPLICATION

This application claims priority of Taiwan Application No. 107108933 filed on Mar. 16, 2018.

BACKGROUND OF THE INVENTION

1. Field of the Invention

The present invention is related to a recharger, and more particularly, to a recharger with over-temperature protection and capable of recording over-temperature information.

2. Description of the Prior Art

With rapid development in technology, a variety of 3C products is available for consumer use. Among them, portable electronic devices, such as cellular phones, laptop computers and digital cameras, are normally powered by batteries. Each year consumers dispose of billions of batteries, all containing toxic or corrosive materials which become hazardous waste and pose threats to health and the environment if improperly disposed. Rechargeable batteries, such as Lithium-ion batteries, are advantageous over single-use batteries in total cost of ownership, resource conservation, environmental impact and performance.

The energy used to charge rechargeable batteries usually comes from arecharger using AC mains electricity or a vehicle's DC power outlet. A recharger typically includes an over-charge protection circuit, an over-discharge protection circuit, an over-current protection circuit, and an over-temperature protection circuit for preventing hazards or permanent damage to the batteries due to an over-charge occurrence, an over-discharge occurrence, an over-current occurrence or an over-temperature occurrence. A prior art recharger with over-temperature protection generally adopts an automatic recovery mechanism. More specifically, when over-temperature protection is triggered, a controller of the prior art recharger turns off for stopping the output of the recharger. When the temperature of the recharger drops to a normal value, the controller is re-activated for resuming the operation of the recharger.

However, when the prior art recharger activates over-temperature protection, there is no knowledge of which component is over-heated, thus unable to perform corresponding analysis or debugging for locating the cause of over-temperature occurrences. Therefore, there is a need for a recharger with over-temperature protection and capable of recording over-temperature information.

SUMMARY OF THE INVENTION

The present invention provides a recharger with over-temperature protection and capable of recording over-temperature information. The recharger includes a power supply circuit configured to provide an auxiliary voltage, an output circuit configured to provide an output voltage, a detection circuit, a micro-controller, and a restart circuit. The detection circuit includes a voltage-dividing resistor having a first end coupled to the auxiliary voltage and a second end, and an NTC thermistor having a first end coupled to the second end of the voltage-dividing resistor and a second end coupled to a bias voltage. The micro-controller includes a first pin coupled between the voltage-dividing resistor and the NTC thermistor and configured to turn off when a level of the first pin is lower than a reference voltage. The restart circuit includes a comparator having a positive input end coupled to the first pin, a negative input end coupled to a restart voltage, and an output end arranged to output an enable signal when the level of the first pin is higher than the restart voltage, thereby activating the output circuit for providing the output voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the operation of a recharger according to an embodiment of the present invention.

DETAILED DESCRIPTION

Figure 1:
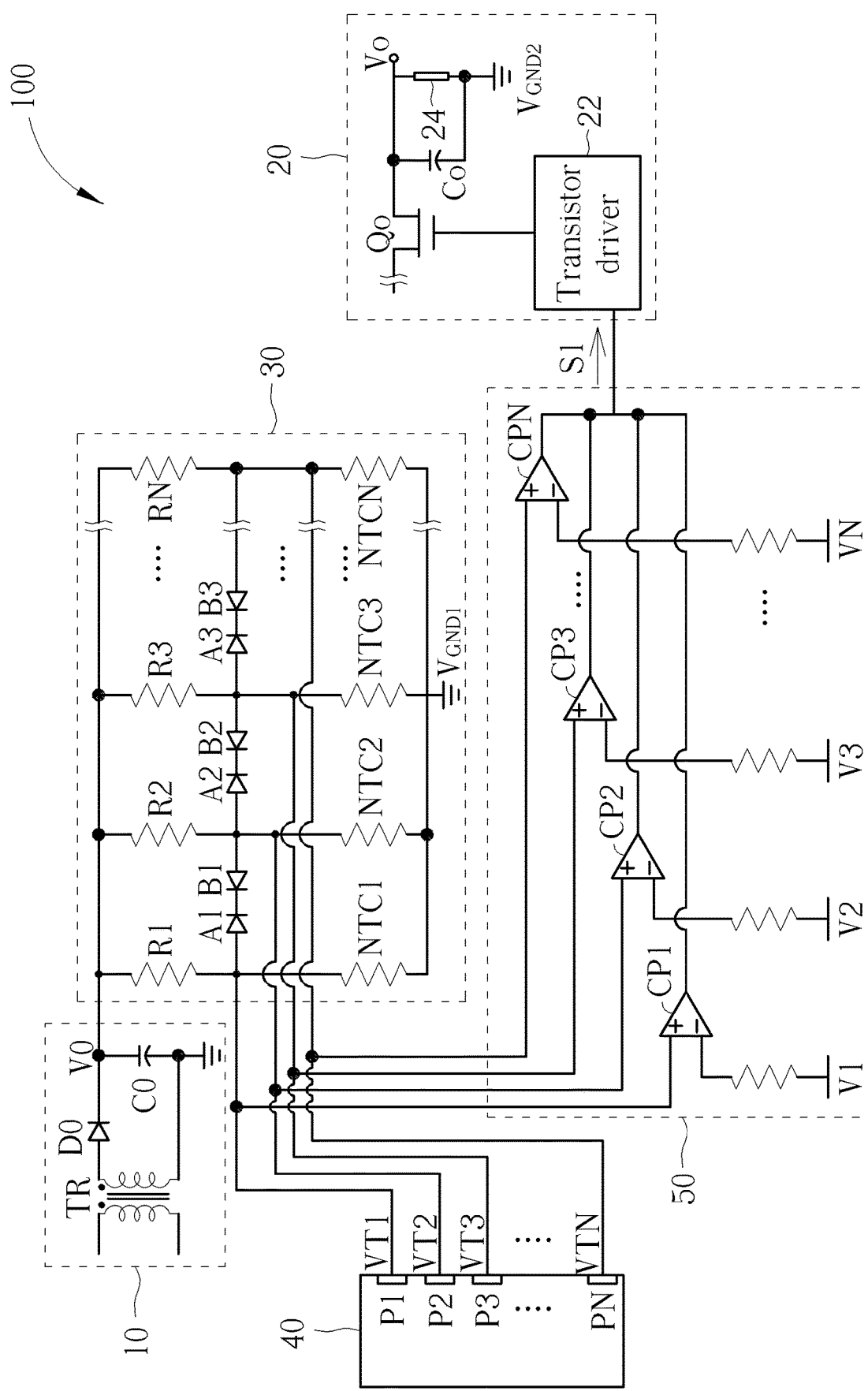
FIG. 1 is a diagram illustrating a recharger with over-temperature protection and capable of recording over-temperature information according to an embodiment of the present invention.

FIG. 1 is a diagram illustrating a recharger 100 with over-temperature protection and capable of recording over-temperature information according to an embodiment of the present invention. The recharger 100 includes a power supply circuit 10, an output circuit 20, a detection circuit 30, a micro-controller 40, and a restart circuit 50.

The power supply circuit 10, including an auxiliary winding TR, an auxiliary diode D0, and an auxiliary capacitor C0, is configured to provide an auxiliary voltage V0 to the detection circuit 30. However, the structure of the power supply circuit 10 does not limit the scope of the present invention.

The output circuit 20 includes a transistor driver 22, an output switch Qo, an output capacitor Co, and an output load 24. The transistor driver 22 is configured to conduct the output switch Qo according to an enable signal S1, thereby providing an output voltage Vo for charging a battery. However, the structure of the output circuit 20 does not limit the scope of the present invention.

The detection circuit 30 includes N voltage-dividing loops and (N−1) diode circuits, wherein N is an integer larger than 1. Each voltage-dividing loop includes a voltage-dividing resistor (respectively represented by R1~RN) and a negative temperature coefficient (NTC) thermistor (respectively represented by NTC1~NTCN) coupled in series between the auxiliary voltage V0 and a bias voltage $V_{GND1}$.

In the embodiment of the present invention, the negative temperature coefficient thermistors NTC1~NTCN may be disposed adjacent to different internal devices of the recharger 100 for providing sensing voltages VT1~VTN associated with each corresponding internal device, thereby providing over-temperature alarm. For example, in an embodiment when N=3, the negative temperature coefficient thermistor NTC1 may be disposed adjacent to a main transformer (not shown) of the recharger 100 for detecting the operational temperature of the main transformer (related to the sensing voltage VT1), the negative temperature coefficient thermistor NTC2 may be disposed adjacent to an output diode (not shown) of the recharger 100 for detecting the operational temperature of the output diode (related to the sensing voltage VT2), and the negative temperature coefficient thermistor NTC3 may be disposed adjacent to a main switch (not shown) of the recharger 100 for detecting the operational temperature of the main switch (related to the sensing voltage VT3), wherein:

$$VT1=(V0-V_{GND1})*NTC1/(R1+NTC1),$$

$$VT2=(V0-V_{GND1})*NTC2/(R2+NTC2), \text{ and}$$

$$VT3=(V0-V_{GND1})*NTC3/(R3+NTC3).$$

Meanwhile, each diode circuit includes two uni-directional diodes (respectively represented by A1 and B1, A2 and B2, . . . , AN and BN) coupled in series between two adjacent voltage-dividing loops with their cathodes connected to each other. The (N+1) diode circuits can isolate the negative temperature coefficient thermistors in adjacent voltage-dividing loops, thereby preventing non-ideal characteristics or thermal resistance variations from influencing the stability of the negative temperature coefficient thermistors.

The micro-controller 40 includes N pins P1~Pn respectively coupled to the sensing voltages VT1~VTN provided by the N voltage-dividing loops. The micro-controller 40 is configured to compare the sensing voltages VT1~VTN respectively with built-in reference voltages $V_{REF1}$~$V_{REFN}$, thereby determining whether the micro-controller 40 should be turned off for shutting down the recharger 100 or should be turned on. For example, in the above-mentioned embodiment of N=3, when the operational temperature of the main transformer (not shown) increases, the resistance of the negative temperature coefficient thermistor NTC1 decreases due to its negative temperature coefficient characteristic, and the sensing voltage VT1 provided across the negative temperature coefficient thermistor NTC1 by voltage-dividing the auxiliary voltage V0 also decreases accordingly. Once the sensing voltage VT1 drops below the built-in reference voltage $V_{REF1}$ of the micro-controller 40, the micro-controller 40 is configured to turn off for shutting down the recharger 100. Similarly, when the operational temperature of the output diode (not shown) increases, the resistance of the negative temperature coefficient thermistor NTC2 decreases due to its negative temperature coefficient characteristic, and the sensing voltage VT2 provided across the negative temperature coefficient thermistor NTC2 by voltage-dividing the auxiliary voltage V0 also decreases accordingly. Once the sensing voltage VT2 drops below the built-in reference voltage $V_{REF2}$ of the micro-controller 40, the micro-controller 40 is configured to turn off for shutting down the recharger 100. Similarly, when the operational temperature of the main switch (not shown) increases, the resistance of the negative temperature coefficient thermistor NTC3 decreases due to its negative temperature coefficient characteristic, and the sensing voltage VT3 provided across the negative temperature coefficient thermistor NTC3 by voltage-dividing the auxiliary voltage V0 also decreases accordingly. Once the sensing voltage VT3 drops below the built-in reference voltage $V_{REF3}$ of the micro-controller 40, the micro-controller 40 is configured to turn off for shutting down the recharger 100. In other words, when any one of the negative temperature coefficient thermistors NTC1~NTC3 detects an over-temperature occurrence of a specific internal device, the micro-controller 40 is configured to turn off for shutting down the recharger 100.

The restart circuit 50 includes N comparators CP1~CPN, each of which includes a positive input end, a negative input end, and an output end. The positive input ends of the comparators CP1~CPN are coupled to the pins P1~PN of the micro-controller 40, respectively. The negative input ends of the comparators CP1~CPN are coupled to restart voltages V1~VN, respectively. The output ends of the comparators CP1~CPN are coupled to the output circuit 20.

For example, in the above-mentioned embodiment of N=3, after the recharger 100 has been turned off for a period due to an over-temperature occurrence of the main transformer (not shown), the operational temperature of the main transformer may return to normal and the resistance of the corresponding negative temperature coefficient thermistor NTC1 may increase due to negative temperature coefficient characteristic, thereby allowing the sensing voltage VT1 provided across the negative temperature coefficient thermistor NTC1 by voltage-dividing the auxiliary voltage V0 to increase accordingly. Once the sensing voltage VT1 exceeds the built-in reference voltage $V_{REF1}$ of the micro-controller 40, the micro-controller 40 is configured to be turned on. Once the positive input end of the comparator CP1 (coupled to the sensing voltage VT1) exceeds the built-in restart voltage V1, the comparator CP1 is configured to output the enable signal S1 to the transistor driver 22 of the output circuit 20, thereby turning on (short-circuiting) the output switch Qo for resuming the operation of the recharger 100.

Similarly, in the above-mentioned embodiment of N=3, after the recharger 100 has been turned off for a period due to an over-temperature occurrence of the output diode (not shown), the operational temperature of the output diode may return to normal and the resistance of the corresponding negative temperature coefficient thermistor NTC2 may increase due to negative temperature coefficient characteristic, thereby allowing the sensing voltage VT2 provided across the negative temperature coefficient thermistor NTC2 by voltage-dividing the auxiliary voltage V0 to increase accordingly. Once the sensing voltage VT2 exceeds the built-in reference voltage $V_{REF2}$ of the micro-controller 40, the micro-controller 40 is configured to be turned on. Once the positive input end of the comparator CP2 (coupled to the sensing voltage VT2) exceeds the built-in restart voltage V2, the comparator CP2 is configured to output the enable signal S1 to the transistor driver 22 of the output circuit 20, thereby turning on (short-circuiting) the output switch Qo for resuming the operation of the recharger 100.

Similarly, in the above-mentioned embodiment of N=3, after the recharger 100 has been turned off for a period due to an over-temperature occurrence of the main switch (not shown), the operational temperature of the main switch may return to normal and the resistance of the corresponding negative temperature coefficient thermistor NTC3 may increase due to negative temperature coefficient characteristic, thereby allowing the sensing voltage VT3 provided across the negative temperature coefficient thermistor NTC3 by voltage-dividing the auxiliary voltage V0 to increase accordingly. Once the sensing voltage VT3 exceeds the built-in reference voltage $V_{REF3}$ of the micro-controller 40, the micro-controller 40 is configured to be turned on. Once the positive input end of the comparator CP3 (coupled to the sensing voltage VT3) exceeds the built-in restart voltage V3, the comparator CP3 is configured to output the enable signal S1 to the transistor driver 22 of the output circuit 20, thereby turning on (short-circuiting) the output switch Qo for resuming the operation of the recharger 100.

Also, the recharger 100 of the present invention can record an over-temperature occurrence of an over-heated internal device and its temperature for subsequent analysis or debugging to locate the cause of the over-temperature occurrence. In a recharger, it is typically easiest for the main transformer, the output diode and the main switch to overheat than other internal devices. Different internal devices have respective definitions of over-temperature occurrences. In the present invention, the negative temperature coefficient thermistors NTC1-NTC3 having different resistance associated with the over-temperature definitions of the main transformer, the output diode and the main switch may be used to detect the over-temperature occurrences of the main transformer, the output diode and the main switch. In the detection circuit 30, two diode circuits may be used for isolating the three voltage-dividing loops so that the over-temperature information of the main transformer, the output diode and the main switch may be recorded separately and accurately.

FIG. 2 is a diagram illustrating the operation of the recharger 100 according to an embodiment of the present invention. In the above-mentioned embodiment of N=3, it is assumed that the power supply circuit 10 provides the auxiliary voltage V0=20V, and the resistance of the voltage-dividing resistors R1~R3 in the detection circuit 30 is 5 KΩ. FIG. 2 depicts the definition of over-temperature occurrence, the resistance of the negative temperature coefficient thermistors NTC1~NTC3 at over-temperature occurrence, the values of the sensing voltages VT1~VT3 at over-temperature occurrence, and the restart voltages V1~V3. According to the values of the sensing voltages VT1~VT3, the micro-controller 40 is able to determine which internal device is over-heated and its exact temperature. Also, for each internal device, a hysteresis may be introduced to allow the micro-controller 40 to have different turn-on and turn-off thresholds (V1>VT1, V2>VT2, . . . , VN>VN1), thereby preventing constant switching on/off of the recharger 100.

In conclusion, the present invention provides a recharger with over-temperature protection and capable of recording over-temperature information. Multiple negative temperature coefficient thermistors having different resistance are used to detect over-temperature occurrences of multiple internal devices and their exact temperatures. Therefore, subsequent analysis or debugging may be performed for locating the cause of each over-temperature occurrence.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A recharger with over-temperature protection and capable of recording over-temperature information, comprising:
a power supply circuit configured to provide an auxiliary voltage;
an output circuit configured to provide an output voltage;
a detection circuit comprising:
a first voltage-dividing resistor having a first end coupled to the auxiliary voltage and a second end; and
a first negative temperature coefficient (NTC) thermistor having a first end coupled to the second end of the first voltage-dividing resistor and a second end coupled to a first bias voltage;
a micro-controller comprising a first pin coupled between the first voltage-dividing resistor and the first NTC thermistor and configured to turn off when a level of the first pin is lower than a first reference voltage; and
a restart circuit comprising:
a first comparator including:
a first positive input end coupled to the first pin;
a first negative input end coupled to a first restart voltage; and
a first output end arranged to output an enable signal when the level of the first pin is higher than the first restart voltage, thereby activating the output circuit for providing the output voltage.

2. The recharger of claim 1, wherein the micro-controller is further configured to be turned on when the level of the first pin exceeds the first reference voltage.

3. The recharger of claim 1, wherein the first NTC thermistor is disposed adjacent to an internal device of the recharger for detecting an operational temperature of the internal device.

4. The recharger of claim 3, wherein the micro-controller is further configured to record an over-temperature occurrence of the internal device when the level of the first pin is lower than the first reference voltage and record a temperature of the internal device at the over-temperature occurrence.

5. The recharger of claim 3, wherein the internal device is a main transformer, an output diode or a main switch of the recharger.

6. The recharger of claim 1, wherein the restart voltage is larger than the first reference voltage.

7. The recharger of claim 1, wherein:
the detection circuit further comprises:
a second voltage-dividing resistor having a first end coupled to the auxiliary voltage and a second end; and
a second NTC thermistor having a first end coupled to the second end of the second voltage-dividing resistor and a second end coupled to the first bias voltage;
the micro-controller further comprises a second pin coupled between the second voltage-dividing resistor and the second NTC thermistor and is further configured to turn off when a level of the second pin is lower than a second reference voltage; and
the restart circuit further comprises:
a second comparator including:
a second positive input end coupled to the second pin;
a second negative input end coupled to a second restart voltage; and
a second output end arranged to output the enable signal when the level of the second pin is higher than the second restart voltage, thereby activating the output circuit for providing the output voltage.

8. The recharger of claim 7, wherein:
the first NTC thermistor is disposed adjacent to a first internal device of the recharger for detecting an operational temperature of the first internal device; and
the second NTC thermistor is disposed adjacent to a second internal device of the recharger for detecting an operational temperature of the second internal device.

9. The recharger of claim 8, wherein the micro-controller is further configured to:
record a first over-temperature occurrence of the first internal device when the level of the first pin is lower than the first reference voltage and record a temperature of the first internal device at the first over-temperature occurrence; or record a second over-temperature occurrence of the second internal device when the level of the second pin is lower than the second reference voltage and record a temperature of the second internal device at the second over-temperature occurrence.

10. The recharger of claim 7, further comprising:
a first diode including:
   a first anode coupled between the first voltage-dividing resistor and the first NTC thermistor; and
   a second cathode; and
a second diode including:
   a second anode coupled between the second voltage-dividing resistor and the second NTC thermistor; and
   a second cathode coupled to the first cathode.

\* \* \* \* \*